(12) United States Patent
Yokoyama et al.

(10) Patent No.: US 9,618,245 B2
(45) Date of Patent: Apr. 11, 2017

(54) EJECTOR

(71) Applicant: DENSO CORPORATION, Kariya, Aichi-pref. (JP)

(72) Inventors: Yoshiyuki Yokoyama, Obu (JP); Haruyuki Nishijima, Obu (JP); Etsuhisa Yamada, Kariya (JP); Daisuke Nakajima, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 116 days.

(21) Appl. No.: 14/655,745

(22) PCT Filed: Dec. 23, 2013

(86) PCT No.: PCT/JP2013/007525
§ 371 (c)(1),
(2) Date: Jun. 26, 2015

(87) PCT Pub. No.: WO2014/103276
PCT Pub. Date: Jul. 3, 2014

(65) Prior Publication Data
US 2015/0345840 A1 Dec. 3, 2015

(30) Foreign Application Priority Data

Dec. 27, 2012 (JP) .................................. 2012-285640
Nov. 11, 2013 (JP) .................................. 2013-233017

(51) Int. Cl.
*F25B 41/00* (2006.01)
*F04F 5/20* (2006.01)
(Continued)

(52) U.S. Cl.
CPC ................ *F25B 41/00* (2013.01); *F04F 5/20* (2013.01); *F04F 5/46* (2013.01); *F04F 5/54* (2013.01);
(Continued)

(58) Field of Classification Search
CPC ........ F25B 2341/001; F25B 2341/0011; F25B 9/08; F25B 2341/0016; F25B 41/062; F04F 5/20
See application file for complete search history.

(56) References Cited

U.S. PATENT DOCUMENTS

2001/0025499 A1   10/2001   Takeuchi et al.
2002/0000095 A1   1/2002    Takeuchi et al.
(Continued)

FOREIGN PATENT DOCUMENTS

JP   S59123700 U   8/1984
JP   S61076800 A   4/1986
(Continued)

OTHER PUBLICATIONS

U.S. Appl. No. 14/655,746, filed Jun. 26, 2015.
(Continued)

*Primary Examiner* — Cassey D Bauer
(74) *Attorney, Agent, or Firm* — Harness, Dickey & Pierce, P.L.C.

(57) ABSTRACT

A body of an ejector includes a diffuser passage, in which an ejection refrigerant jetted from a nozzle passage and a suction refrigerant drawn from a suction passage are mixed together and pressurized by arranging a passage formation member, and a gas-liquid separation space, in which the refrigerant flowing out of the diffuser passage is separated into gas and liquid by the action of a centrifugal force. An inlet part of an oil return passage that is open in the gas-liquid separation space is arranged at a position closer to an outer peripheral side than to an axis center of the passage formation member.

7 Claims, 9 Drawing Sheets

(51) Int. Cl.
    *F04F 5/46*          (2006.01)
    *F04F 5/54*          (2006.01)
    *F25B 41/06*        (2006.01)
    *F25B 40/02*        (2006.01)
    *F25B 27/00*        (2006.01)

(52) U.S. Cl.
    CPC ............ *F25B 40/02* (2013.01); *F25B 41/062* (2013.01); *F25B 27/00* (2013.01); *F25B 2327/001* (2013.01); *F25B 2341/0012* (2013.01); *F25B 2400/23* (2013.01); *F25B 2500/18* (2013.01)

(56) References Cited

U.S. PATENT DOCUMENTS

| | | |
|---|---|---|
| 2002/0162518 A1 | 11/2002 | Dumaz et al. |
| 2007/0271942 A1* | 11/2007 | Yokoyama ............ F25B 41/00 62/278 |
| 2008/0000263 A1 | 1/2008 | Oomura et al. |
| 2008/0075613 A1 | 3/2008 | Doms et al. |
| 2010/0175422 A1 | 7/2010 | Yamada et al. |
| 2012/0247146 A1 | 10/2012 | Yamada et al. |
| 2014/0020424 A1 | 1/2014 | Suzuki et al. |

FOREIGN PATENT DOCUMENTS

| | | |
|---|---|---|
| JP | H01250000 A | 10/1989 |
| JP | 3322263 B1 | 9/2002 |
| JP | 3331604 B2 | 10/2002 |
| JP | 2002333000 A | 11/2002 |
| JP | 2003014318 A | 1/2003 |
| JP | 2003515702 A | 5/2003 |
| JP | 2003336915 A | 11/2003 |
| JP | 2008008599 A | 1/2008 |
| JP | 2008202812 A | 9/2008 |
| JP | 2008232458 A | 10/2008 |
| JP | 2009144607 A | 7/2009 |
| JP | 2010181136 A | 8/2010 |
| JP | 2010210111 A | 9/2010 |
| JP | 2012202652 A | 10/2012 |
| JP | 2012202653 A | 10/2012 |
| JP | 2013177879 A | 9/2013 |
| WO | WO-2014103277 A1 | 7/2014 |

OTHER PUBLICATIONS

International Search Report and Written Opinion (in Japanese with English Translation) for PCT/JP2013/007525, mailed Mar. 11, 2014; ISA/JP.

* cited by examiner

EJECTOR

CROSS REFERENCE TO RELATED APPLICATIONS

This application is a U.S. National Phase Application under 35 U.S.C. 371 of International Application No. PCT/JP2013/007525 filed on Dec. 23, 2013 and published in Japanese as WO 2014/103276 A1 on Jul. 3, 2014. This application is based on and claims the benefit of priority from Japanese Patent Applications No. 2012-285640 filed on Dec. 27, 2012, and No. 2013-233017 filed on Nov. 11, 2013. The entire disclosures of all of the above applications are incorporated herein by reference.

TECHNICAL FIELD

The present disclosure relates to an ejector that depressurizes a fluid, and draws the fluid by a suction action of an ejection fluid jetted at high speed.

BACKGROUND ART

Conventionally, ejectors have been known as a depressurizing device applied to a vapor compression refrigeration cycle device. The ejector of this type has a nozzle portion that depressurizes refrigerant, draws a gas-phase refrigerant which has flowed out of an evaporator due to a suction action of an ejected refrigerant ejected from the nozzle portion, mixes the ejected refrigerant with the suction refrigerant in a pressure increase part (diffuser portion), thereby being capable of increasing the pressure.

Therefore, in the refrigeration cycle device having the ejector as the depressurizing device (hereinafter referred to as "ejector refrigeration cycle"), a motive power consumption of a compressor can be reduced with the use of the refrigerant pressure increase action in a pressure increase part of the ejector, and a coefficient of performance (COP) of the cycle can be improved more than that of a normal refrigeration cycle device having an expansion valve as the depressurizing device.

Further, Patent Document 1 discloses an ejector having the nozzle portion which depressurizes the refrigerant in two stages as the ejector applied to the ejector refrigeration cycle. In more detail, in the ejector of Patent Document 1, the refrigerant of a high pressure liquid-phase state is depressurized into a gas-liquid two-phase state in a first nozzle, and the refrigerant that has been the gas-liquid two-phase state flows into a second nozzle.

With the above configuration, in the ejector of Patent Document 1, boiling of the refrigerant in the second nozzle is promoted to improve a nozzle efficiency as the overall nozzle portion, and the COP is to be further improved as the overall ejector refrigeration cycle.

Also, in the general ejector, a diffuser portion (pressure increase part) is coaxially arranged on an extension in an axial direction of the nozzle portion. Further, Patent Document 2 discloses that a spread angle of the diffuser portion thus arranged is relatively reduced to enable an improvement in the ejector efficiency.

The nozzle efficiency means energy conversion efficiency when a pressure energy of the refrigerant is converted into a kinetic energy in the nozzle portion. The ejector efficiency means energy conversion efficiency as the overall ejector.

PRIOR ART DOCUMENT

Patent Document

Patent Document 1: JP 3331604
Patent Document 2: JP 2003-14318

SUMMARY OF THE INVENTION

However, according to the present inventors' study, in the ejector of Patent Document 1, for example, a heat load of the ejector refrigeration cycle becomes low, and a refrigerant pressure difference (a difference between a high pressure and a low pressure) between a high-pressure side and a low-pressure side in the cycle is reduced. As a result, the difference between the high pressure and the low pressure is depressurized by the first nozzle, and most of the refrigerant may not be depressurized in the second nozzle.

In this case, the nozzle efficiency by causing the gas-liquid two phase refrigerant to flow in the second nozzle is not improved. As a result, the refrigerant may not be sufficiently pressurized by the diffuser portion.

On the contrary, when the diffuser portion having the relatively small spread angle disclosed in Patent Document 2 may be applied to the ejector of Patent Document 1 to improve the ejector efficiency, thereby pressurizing the refrigerant sufficiently in the diffuser portion even in the low load of the ejector refrigeration cycle.

However, when the diffuser portion of this type is applied, a length of the nozzle portion in the axial direction becomes longer as a whole of the ejector, resulting in a risk that a body of the ejector becomes unnecessarily longer in the normal load of the ejector refrigeration cycle.

Under the circumstances, the present inventors have proposed an ejector applied to an ejector refrigeration cycle in Japanese Patent Application No. 2012-184950 (hereinafter referred to as "example of preceding application") previously. The ejector includes a body formed with a swirling space in which a refrigerant flowing out of a radiator swirls, a depressurizing space in which the refrigerant flowing out of the swirling space is decompressed, a suction passage communicating with a downstream side of the depressurizing space in a refrigerant flow, through which the refrigerant flowing out of the evaporator is drawn, and a pressurizing space in which the refrigerant jetted from the depressurizing space and the refrigerant drawn out of the suction passage are mixed together and pressurized; and a passage formation member at least partially arranged in the depressurizing space and the pressurizing space, and having a conical shape that increases in cross-sectional area with distance from the depressurizing space. In the body, a refrigerant passage provided between an inner peripheral surface of a portion defining the depressurizing space and an outer peripheral surface of the passage formation member defines a nozzle passage functioning as a nozzle that depressurizes and jets the refrigerant flowing out of the swirling space. In the body, a refrigerant passage provided between an inner peripheral surface of a portion defining the pressurizing space and an outer peripheral surface of the passage formation member defines a diffuser passage functioning as a diffuser that mixes the jetted refrigerant with the drawn refrigerant, and pressurizes the mixed refrigerant. A gas-liquid separation space in which the refrigerant flowing out of the diffuser passage is separated into gas and liquid due to the action of a centrifugal force is defined in the body.

In the ejector of the example of preceding application, the refrigerant swirls in the swirling space with the results that a refrigerant pressure on a swirling center side within the swirling space can be reduced to a pressure of a saturated liquid-phase refrigerant, or a pressure at which the refrigerant is depressurized and boiled (cavitation occurs). With the above operation, it is made possible that a larger amount of gas-phase refrigerant is present on an inner peripheral side than an outer peripheral side of a swirling center axis. This leads to a two-phase separation state in which the refrigerant has a gas single phase in the vicinity of a swirling center line within the swirling space, and has a liquid single phase around the vicinity thereof.

The refrigerant of the two-phase separation state flows into the nozzle passage, and boiling of the refrigerant is promoted by wall surface boiling and interface boiling. Therefore, the refrigerant puts into a gas-liquid mixed state in which a gas phase and a liquid phase are homogeneously mixed together in the vicinity of a minimum flow area part of the nozzle passage. Further, the refrigerant which has put into the gas-liquid mixed state is blocked (choked) in the vicinity of the minimum flow area part of the nozzle passage, and a flow rate of the refrigerant in the gas-liquid mixed state is accelerated to a two-phase sonic speed.

The refrigerant thus accelerated to the two-phase sonic speed becomes an ideal two-phase spray flow in which the two phases are homogeneously mixed together on a downstream side of the minimum flow area part in the nozzle passage, and the flow rate can be made to further increase. As a result, the energy conversion efficiency (corresponding to the nozzle efficiency) in converting a pressure energy of the refrigerant into a velocity energy in the nozzle passage can be improved.

Furthermore, in the ejector of the example of preceding application, the passage formation member formed into the conical shape is employed, and the diffuser passage has an annular shape in a cross-section perpendicular to an axial direction of the passage formation member. The shape of the diffuser passage expands along an outer periphery of the passage formation member with distance from the depressurizing space, and the refrigerant flowing through the diffuser passage is swirled around the axis of the passage formation member.

With the above configuration, since the refrigerant flow channel for pressurizing the refrigerant in the diffuser passage can be formed in a spiral shape, an increase in the axial dimension of the diffuser passage can be restricted, and upsizing in the body as the overall ejector can be restricted.

Further, in the ejector of the example of preceding application, the refrigerant flowing out of the diffuser passage is separated into gas and liquid by the action of the centrifugal force in the gas-liquid separation space defined in the interior of the body. Therefore, as compared with a case in which a gas-liquid separation device is arranged outside the body, the refrigerant can be efficiently separated into gas and liquid in the gas-liquid separation space, and a capacity of the gas-liquid separation space can be effectively reduced.

The reason is because the refrigerant flowing out of the diffuser passage into the gas-liquid separation space has already had a velocity component in a swirling direction. That is, since the refrigerant can swirl at a high speed in the gas-liquid separation space due to the velocity component in the swirling direction, the gas-liquid separation can be efficiently performed. Further, since there is no need to provide a space for generating or growing a swirling flow of the refrigerant in the gas-liquid separation space, a capacity of the gas-liquid separation space can be effectively reduced.

Therefore, according to the ejector in the example of preceding application, the ejector integrated with the gas-liquid separation device which can exert the higher nozzle efficiency can be realized without upsizing the body irrespective of load variations of the refrigeration cycle.

A refrigerant oil for lubrication of a compressor is mixed into the refrigerant of the general refrigeration cycle device, and a refrigerant compatible to the liquid-phase refrigerant is employed as the refrigerant oil of this type. For that reason, in the refrigeration cycle device having a gas-liquid separator (accumulator) on a low pressure side, a part of the separated liquid-phase refrigerant returns to an intake side of the compressor through an oil return passage to lubricate the compressor.

However, as with the ejector of the example of preceding application, in the configuration where the cross-section perpendicular to the axial direction of the diffuser passage has the annular shape, and the diffuser passage has a shape gradually enlarged on the outer peripheral side toward the downstream side in the refrigerant flow, or in the configuration where the refrigerant swirls in the gas-liquid separation space having a relatively small capacity at a high speed to perform efficient gas-liquid separation, the liquid-phase refrigerant higher in density than the gas-phase refrigerant is liable to be localized on the outer peripheral side in the gas-liquid separation space.

Therefore, unless the oil return passage is appropriately provided, the liquid-phase refrigerant into which the refrigerant oil is mixed cannot return to the intake side of the compressor. This may adversely affect the durability life of the compressor.

In view of the above, it is an objective of the present disclosure to provide an ejector that is integrated with a gas-liquid separation device, the ejector being capable of causing a liquid-phase refrigerant, which is separated by a gas-liquid separation device and mixed with a refrigerant oil, to appropriately flow out to an external.

According to an aspect of the present disclosure, an ejector is used for a vapor compression refrigeration cycle device in which a refrigerant oil for lubrication of a compressor is mixed into a refrigerant. The ejector includes: (i) a body including a refrigerant inlet, a swirling space in which a refrigerant flowing from a refrigerant inlet is swirled, a depressurizing space in which the refrigerant flowing out of the swirling space is depressurized, a suction passage that communicates with a downstream side of the depressurizing space in a refrigerant flow and draws a refrigerant from an external, and a pressurizing space in which an ejection refrigerant jetted from the depressurizing space is mixed with a suction refrigerant drawn from the suction passage; and (ii) a passage formation member that is at least partially arranged inside the depressurizing space and inside the pressurizing space, and has a conical shape in which a cross-sectional area increases with distance from the depressurizing space. A refrigerant passage provided between an inner peripheral surface of a portion of the body, which defines the depressurizing space, and an outer peripheral surface of the passage formation member is a nozzle passage functioning as a nozzle that depressurizes and jets the refrigerant flowing out of the swirling space. A refrigerant passage provided between an inner peripheral surface of a portion of the body, which defines the pressurizing space, and an outer peripheral surface of the passage formation member is a diffuser passage functioning as a diffuser that pressurizes a mixture of the ejection refrigerant and the suction refrigerant. The diffuser passage has an annular shape in a cross-section surface perpendicular to an axial direction of the passage formation member. The body further includes a gas-liquid separation space that separates the refrigerant flowing out of the diffuser passage into gas and liquid by an action of a centrifugal force, a gas-phase refrigerant outflow passage through which a gas-phase refrigerant separated by the gas-liquid separation space flows out to an intake side of the compressor, and an oil return passage that guides a liquid-phase refrigerant, which is separated by the gas-liquid separation space and mixed with the refrigerant oil, from the gas-liquid separation space to the gas-phase refrigerant outflow passage. The oil return passage has an inlet part that is open in the gas-liquid separation space. A distance from the inlet part of the oil return passage to an axis center of the passage formation member is longer than a distance from the inlet part to an outer peripheral side of the gas-liquid separation space in a radial direction of the passage formation member.

With the above configuration, the energy conversion efficiency (corresponding to the nozzle efficiency) in the nozzle passage can be improved by swirling the refrigerant in the swirling space. Further, an increase in the axial dimension of the diffuser passage can be restricted by swirling the refrigerant flowing through the diffuser passage.

Further, the refrigerant flowing out of the diffuser passage is separated into gas and liquid in the gas-liquid separation space provided in the interior of the body. Therefore, the refrigerant can be efficiently separated into gas and liquid in the gas-liquid separation space, and the capacity of the gas-liquid separation space can be effectively reduced.

In addition, according to the present disclosure, an inlet portion of the oil return passage which is open in the gas-liquid separation space is arranged at a position closer to the outer peripheral side than to the axis center of the passage formation member when viewed from the axial direction of the passage formation member.

Therefore, the liquid-phase refrigerant localized on the outer peripheral side of the gas-liquid separation space can flow into the oil return passage due to the configuration in which the cross-sectional shape of the diffuser passage is annularly formed, or the action of the centrifugal force. The liquid-phase refrigerant into which the refrigerant oil is mixed can flow out to the intake side of the compressor through a gas-phase refrigerant flow passage.

That is, the present disclosure aims at providing an ejector integrated with a gas-liquid separation device which enables a liquid-phase refrigerant separated by a gas-liquid separation space into which a refrigerant oil is mixed to appropriately flow out to an external.

The ejector may further include a swirling promotion portion that promotes the swirling of the refrigerant flowing out of the diffuser passage around an axis of the passage formation member.

Accordingly, since a swirling promotion portion is provided, the refrigerant flowing into the gas-liquid separation space can be surely swirled. Therefore, the refrigerant flowing into the gas-liquid separation space can be surely separated into gas and liquid by the action of the centrifugal force, and the separated liquid-phase refrigerant can surely flow into the oil return passage while being localized on the outer peripheral side of the gas-liquid separation space.

The refrigerant flowing in the diffuser passage may swirl around an axis of the passage formation member.

Accordingly, since the refrigerant flowing into the gas-liquid separation space also swirls, the refrigerant flowing into the gas-liquid separation space can be surely separated into gas and liquid by the action of the centrifugal force. Also, the separated liquid-phase refrigerant can surely flow into the oil return passage while being localized on the outer peripheral side of the gas-liquid separation space.

The passage formation member is not strictly limited to one having only the shape in which the sectional area increases with distance from the depressurizing space. At least a part of the passage formation member may include a shape with the sectional area thereof expanded with distance from the depressurizing space, and the diffuser passage has a shape expanding outward with distance from the depressurizing space according to the shape of the passage formation member.

In addition, the "formed into a conical shape" is not limited to a meaning that the passage formation member is formed into a complete conical shape, but also includes meaning of a shape close to cone or a shape partially including the conical shape. Specifically, the cross-sectional shape taken along the axial direction is not limited to an isosceles triangle, but includes a shape in which two sides between which a vertex is sandwiched are convexed on a radially inner side, a shape in which the two sides between which the vertex is sandwiched are convexed on a radially outer side, and a shape in which the cross-sectional shape is semicircular.

EMBODIMENTS FOR EXPLOITATION OF THE INVENTION

Figure 1:
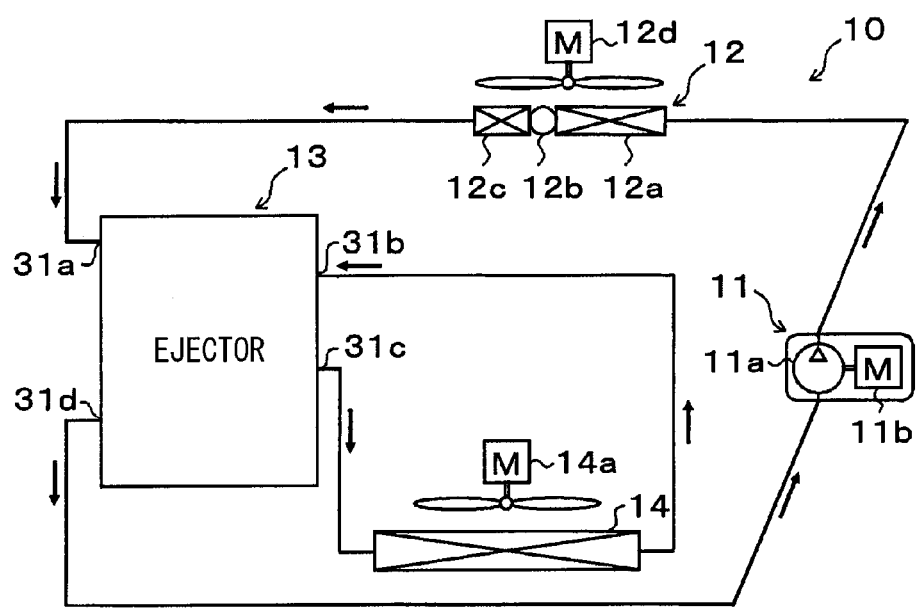
FIG. 1 is a schematic diagram of an ejector refrigeration cycle according to a first embodiment of the present disclosure.

Hereinafter, multiple embodiments for implementing the present invention will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 5. As illustrated in FIG. 1, an ejector 13 according to this embodiment is applied to a vapor compression refrigeration cycle device having an ejector as a refrigerant depressurizing device, that is, an ejector refrigeration cycle 10. Moreover, the ejector refrigeration cycle 10 is applied to a vehicle air conditioning apparatus, and performs a function of cooling blast air which is blown into a vehicle interior that is a space to be air-conditioned.

First, in the ejector refrigeration cycle 10, a compressor 11 draws a refrigerant, pressurizes the refrigerant to a high pressure refrigerant, and discharges the refrigerant. Specifically, the compressor 11 of this embodiment is an electric compressor in which a fixed-capacity compression mechanism 11a and an electric motor 11b for driving the compression mechanism 11a are accommodated in a single housing.

Various compression mechanisms, such as a scroll-type compression mechanism and a vane-type compression mechanism, can be employed as the compression mechanism 11a. Further, the operation (rotating speed) of the electric motor 11b is controlled according to a control signal that is output from a control device to be described below, and any one of an AC motor and a DC motor may be employed as the electric motor 11b.

A refrigerant inlet side of a condenser 12a of a heat radiator 12 is connected to a discharge port of the compressor 11. The heat radiator 12 is a heat exchanger for heat radiation which cools a high-pressure refrigerant, which is discharged from the compressor 11, through the radiation of heat by exchanging heat between the high-pressure refrigerant and vehicle exterior air (outside air) that is blown by a cooling fan 12d.

More specifically, the heat radiator 12 is a so-called subcooling condenser including: a condenser 12a that condenses a high-pressure gas-phase refrigerant, which is discharged from the compressor 11, through the radiation of heat by exchanging heat between the high-pressure gas-phase refrigerant and the outside air, which is blown from the cooling fan 12d; a receiver part 12b that separates gas and liquid of the refrigerant having flowed out of the condenser 12a and stores a surplus liquid-phase refrigerant; and a subcooling portion 12c that subcools a liquid-phase refrigerant having flowed out of the receiver part 12b by exchanging heat between the liquid-phase refrigerant and the outside air blown from the cooling fan 12d.

Meanwhile, the ejector refrigeration cycle 10 employs an HFC based refrigerant (specifically, R134a) as the refrigerant, and forms a subcritical refrigeration cycle in which a high pressure side refrigerant pressure does not exceed a critical pressure of the refrigerant. The ejector refrigeration cycle 10 may employ an HFO based refrigerant (specifically, R1234yf) or the like as the refrigerant. Furthermore, refrigerant oil for lubricating the compressor 11 is mixed with the refrigerant, and a part of the refrigerant oil circulates in the cycle together with the refrigerant.

The cooling fan 12d is an electric blower the rotating speed (the amount of blast air) of which is controlled by a control voltage output from the control device. A refrigerant inlet port 31a of the ejector 13 is connected to a refrigerant outlet side of the subcooling portion 12c of the heat radiator 12.

The ejector 13 functions as a refrigerant depressurizing device for depressurizing the high pressure liquid-phase refrigerant of the subcooling state, which flows out of the heat radiator 12, and allowing the refrigerant to flow out to the downstream side. The ejector 13 also functions as a refrigerant circulating device (refrigerant transport device) that draws (transports) the refrigerant flowing out of an evaporator 14 to be described later by the suction action of a refrigerant flow ejected at high speed to circulate the refrigerant. Further, the ejector 13 according to this embodiment also functions as a gas-liquid separation device for separating the depressurized refrigerant into gas and liquid.

A specific configuration of the ejector 13 will be described with reference to FIGS. 2 and 3. Meanwhile, up and down arrows in FIG. 2 indicate, respectively, up and down directions in a state where the ejector refrigeration cycle 10 is mounted on a vehicle air conditioning apparatus. Also, FIG. 3 is a schematic cross-sectional view illustrating functions of the respective refrigerant passages of the ejector 13, and the same parts as those in FIG. 2 are denoted by identical symbols.

Figure 2:
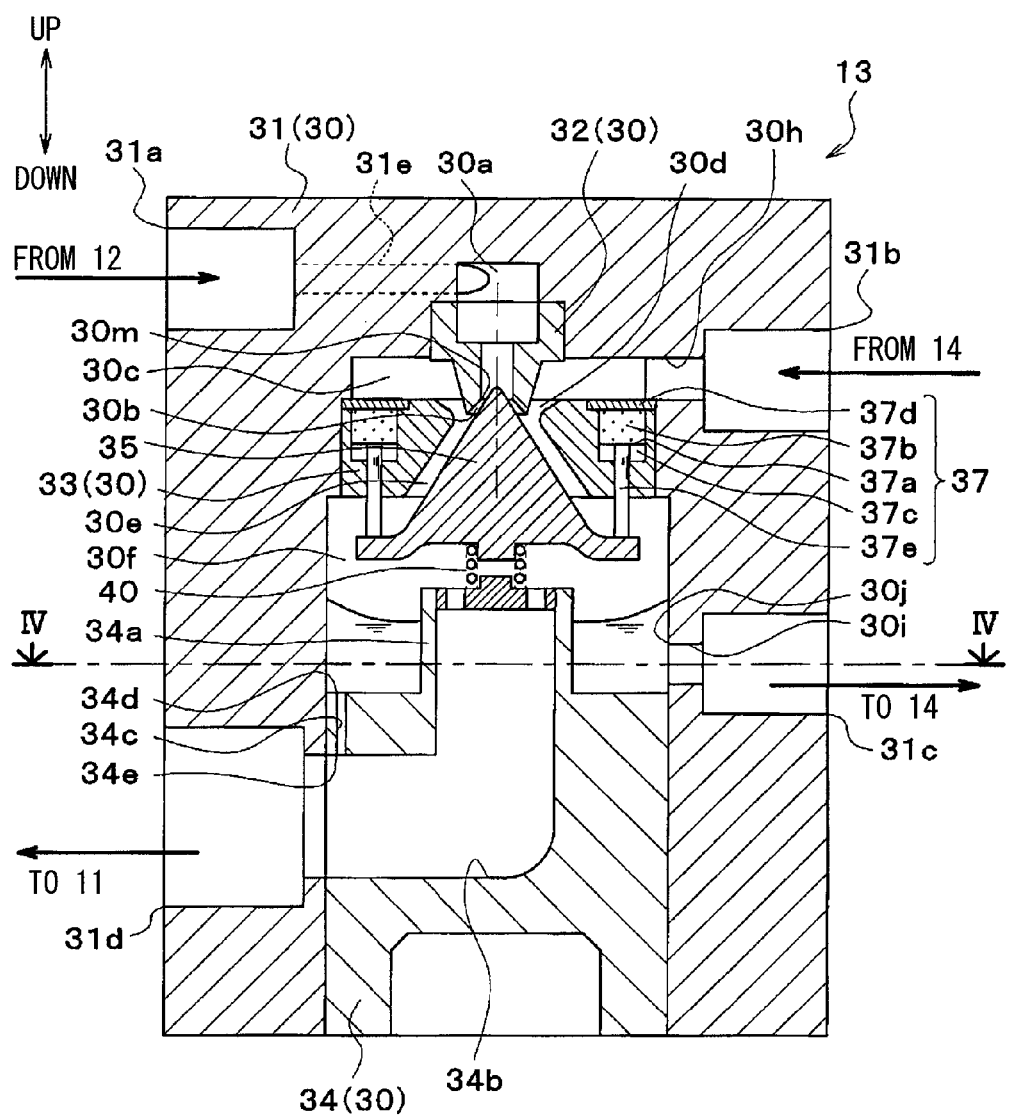
FIG. 2 is a sectional view taken along an axial direction of the ejector according to the first embodiment.
Figure 3:
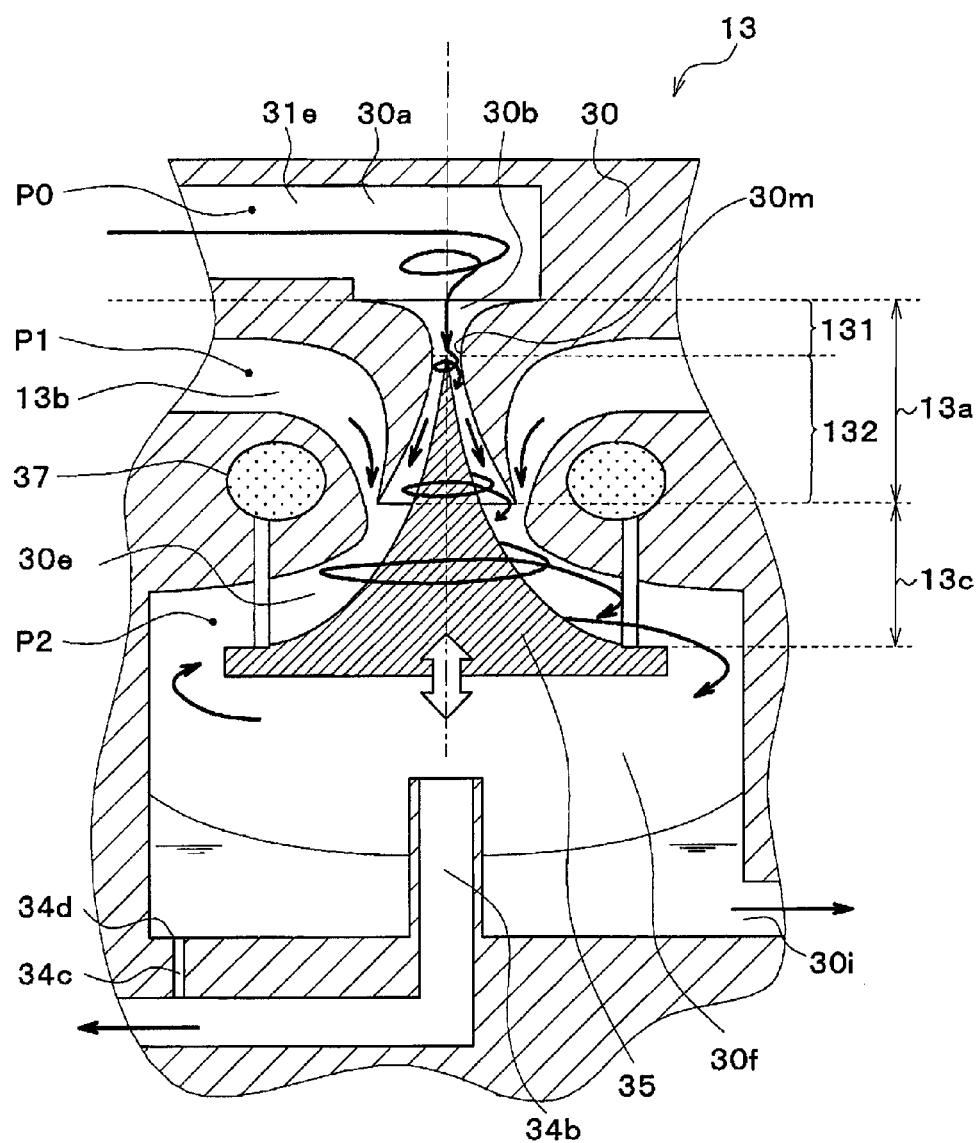
FIG. 3 is a schematic sectional diagram illustrating functions of respective refrigerant passages of the ejector according to the first embodiment.

First, as illustrated in FIG. 2, the ejector 13 according to this embodiment includes a body 30 configured by the combination of plural components. Specifically, the body 30 has a housing body 31 made of external prismatic metal, and forming an outer shell of the ejector 13. A nozzle body 32, a middle body 33, and a lower body 34 are fixed to an interior of the housing body 31.

The housing body 31 is formed with a refrigerant inlet port 31a through which the refrigerant that has flowed out of the heat radiator 12 flows into the housing body 31, and a refrigerant suction port 31b through which the refrigerant that has flowed out of the evaporator 14 is drawn into the housing body 31. The housing body 31 is also formed with a liquid-phase refrigerant outlet port 31c through which a liquid-phase refrigerant separated by a gas-liquid separation space 30f formed within the body 30 flows out to the refrigerant inlet side of the evaporator 14, and a gas-phase refrigerant outlet port 31d through which the gas-phase refrigerant separated by the gas-liquid separation space 30f flows out to the suction side of the compressor 11.

The nozzle body 32 is formed of a substantially conically-shaped metal member that is tapered in a refrigerant flow direction. The nozzle body 32 is fixed to the interior of the housing body 31 by means such as press fitting so that an axial direction of the nozzle body 32 is parallel to a vertical direction (up-down direction in FIG. 2). A swirling space 30a in which the refrigerant that has flowed in from the refrigerant inlet port 31a is swirled is provided between an upper side of the nozzle body 32 and the housing body 31.

The swirling space 30a is formed into a shape of a solid of revolution, and its center axis indicated by an alternate long and short dash line in FIG. 2 extends in the vertical direction. Meanwhile, the revolution solid shape is a solid shape formed by rotating a plane figure around one straight line (center axis) coplanar with the plane figure. More specifically, the swirling space 30a according to this embodiment is formed into a substantially cylindrical shape. The swirling space 30a may be formed in a shape in which a circular cone or a circular truncated cone is combined with a cylinder, or the like.

Further, the refrigerant inlet passage 31e that connects the refrigerant inlet port 31a and the swirling space 30a extends in a tangential direction of an inner wall surface of the swirling space 30a when viewed in a center axis direction of the swirling space 30a. With this configuration, the refrigerant that has flowed into the swirling space 30a from the refrigerant inlet passage 31e flows along an inner wall surface of the swirling space 30a, and swirls within the swirling space 30a.

Meanwhile, the refrigerant inlet passage 31e does not need to be formed to completely match the tangential direction of the swirling space 30a when viewed in the center axis direction of the swirling space 30a. If the refrigerant inlet passage 31e includes at least a component in the tangential direction of the swirling space 30a, the refrigerant inlet passage 31e may be formed to include components in the other directions (for example, components in the axial direction of the swirling space 30a).

Since a centrifugal force acts on the refrigerant swirling in the swirling space 30a, the pressure of a refrigerant present on the center axis side becomes lower than the pressure of a refrigerant present on the outer peripheral side in the swirling space 30a. Accordingly, in this embodiment, during the normal operation of the ejector refrigeration cycle 10, the pressure of a refrigerant present on the center axis side in the swirling space 30a is lowered to a pressure at which a liquid phase refrigerant is saturated or a pressure at which a refrigerant is decompressed and boiled (cavitation occurs).

The adjustment of the pressure of a refrigerant present on the center axis side in the swirling space 30a can be realized by adjusting the swirling flow rate of the refrigerant swirling in the swirling space 30a. Further, the adjustment of the swirling flow rate can be conducted by, for example, adjusting an area ratio between the passage sectional area of the refrigerant inlet passage 31e and the sectional area of the swirling space 30a perpendicular to the axial direction. Meanwhile, the swirling flow rate in this embodiment means the flow rate of the refrigerant in the swirling direction in the vicinity of the outermost peripheral part of the swirling space 30a.

A depressurizing space 30b that allows the refrigerant flowing out from the swirling space 30a to be depressurized, and flow out to the downstream side is formed within the nozzle body 32. The depressurizing space 30b is formed into a revolution solid shape having a cylindrical space coupled with a circular truncated conical space that gradually expands in a refrigerant flow direction continuously from a lower side of the cylindrical space. A center axis of the depressurizing space 30b is arranged coaxially with the center axis of the swirling space 30a.

Further, a minimum passage area part 30m that is most reduced in the refrigerant passage area within the depressurizing space 30b is formed, and a passage formation member 35 that changes the passage area of the minimum passage area part 30m is arranged, within the depressurizing space 30b. The passage formation member 35 is formed into a substantially conical shape gradually widened toward the downstream side of the refrigerant flow, and the center axis of the passage formation member 35 is arranged coaxially with the center axis of the depressurizing space 30b. In other words, the passage formation member 35 is formed into a conical shape having a cross-sectional area that increases with distance from the depressurizing space 30b.

A convergent part 131 and a divergent part 132 are formed as a refrigerant passage provided between an inner peripheral surface of a portion defining the depressurizing space 30b of the nozzle body 32 and an outer peripheral surface on an upper side of the passage formation member 35. More specifically, as illustrated in FIG. 3, the convergent part 131 is a refrigerant passage that is provided on an upstream side of the minimum passage area part 30m in the refrigerant flow, and gradually decreases in the refrigerant passage area. The divergent part 132 is a refrigerant passage that is provided on a downstream side of the minimum passage area part 30m in the refrigerant flow, and gradually increases in the refrigerant passage area.

In the divergent part 132, since the depressurizing space 30b overlaps (overlaps) with the passage formation member 35 when viewed from the radial direction, a sectional shape of the refrigerant passage perpendicular to the axis direction is annular (doughnut shape obtained by removing a smaller-diameter circular shape arranged coaxially from the larger-diameter circular shape). Further, since a spread angle of the passage formation member 35 of this embodiment is smaller than a spread angle of the circular truncated conical space of the depressurizing space 30b, the refrigerant passage area of the divergent part 132 gradually enlarges toward the downstream side in the refrigerant flow.

In this embodiment, the refrigerant passage formed between the inner peripheral surface of the depressurizing space 30b and the outer peripheral surface of a top part of the passage formation member 35 is a nozzle passage 13a that functions as a nozzle. The nozzle passage 13a depressurizes the refrigerant, and also accelerates the flow rate of the refrigerant to the sonic speed, and jets the refrigerant. Further, since the refrigerant flowing into the nozzle passage 13a swirls in the swirling space 30a, the refrigerant flowing through the nozzle passage 13a, and an ejection refrigerant that is the refrigerant jetted from the nozzle passage 13a also have a velocity component in a direction of swirling in the same direction as that of the refrigerant swirling in the swirling space 30a.

Next, as illustrated in FIG. 2, the middle body 33 is formed of a disc-shaped member made of metal that is provided with a through-hole of the revolution solid shape which penetrates through both sides thereof in the center portion. The middle body 33 accommodates therein a driving device 37 on a radially outer side of the through-hole, and the driving device 37 displaces the passage formation member 35. Meanwhile, a center axis of the through-hole of the middle body 33 is arranged coaxially with the center axes of the swirling space 30a and the depressurizing space 30b. Also, the middle body 33 is fixed to the interior of the housing body 31 and the lower side of the nozzle body 32 by means such as press fitting.

Further, an inflow space 30c is formed between an upper surface of the middle body 33 and an inner wall surface of the housing body 31 facing the middle body 33, and the inflow space 30c accumulates the refrigerant that has flowed out of a refrigerant suction port 31b. In this embodiment, because a tapered tip of a lower end of the nozzle body 32 is located within the through-hole of the middle body 33, the inflow space 30c is formed into an annular shape in cross-section when viewed in the center axis direction of the swirling space 30a and the depressurizing space 30b.

It is desirable that a suction refrigerant inlet passage 30h connecting the refrigerant suction port 31b and the inflow space 30c extends in a tangential direction of the inner peripheral wall surface of the inflow space 30c when viewed from the center axial direction of the inflow space 30c. This is because the refrigerant flowing into the inflow space 30c from the refrigerant suction port 31b through a suction refrigerant inlet passage 30h swirls in the same direction as that of the refrigerant in the swirling space 30a, and a swirling flow of the refrigerant flowing into the pressurizing space 30e to be described later out of the inflow space 30c can be promoted.

The through-hole of the middle body 33 has a part in which a refrigerant passage area is gradually reduced toward the refrigerant flow direction so as to match an outer peripheral shape of the tapered tip of the nozzle body 32 in an area where the lower side of the nozzle body 32 is inserted, that is, an area in which the middle body 33 and the nozzle body 32 overlap with each other when viewed in a radial direction perpendicular to the axis line. Accordingly, a suction passage 30d is formed between an inner peripheral surface of the through-hole and an outer peripheral surface of the lower side of the nozzle body 32, and the inflow space 30c communicates with a downstream side of the depressurizing space 30b in the refrigerant flow through the suction passage 30d.

That is, in this embodiment, a suction passage 13b that draws the refrigerant from the external through the refrigerant suction port 31b is defined by the suction refrigerant inlet passage 30h, the inflow space 30c, and the suction passage 30d. Further, a cross-section of the suction passage 13b perpendicular to the center axis of the suction passage 13b is also formed into an annular shape, and the drawn refrigerant flows in the suction passage 13b from the outer peripheral side toward the inner peripheral side of the center axis while swirling.

Also, a pressurizing space 30e formed into a substantially circular truncated conical shape that gradually spreads in the refrigerant flow direction is formed in the through-hole of the middle body 33 on the downstream side of the suction passage 30d in the refrigerant flow. The pressurizing space 30e is a space in which the ejected refrigerant ejected from the above-mentioned nozzle passage 13a is mixed with the suction refrigerant drawn from the suction passage 30d.

The lower side of the above-mentioned passage formation member 35 is located in the pressurizing space 30e. Further, a spread angle of the conical-shaped side surface of the passage formation member 35 in the pressurizing space 30e is smaller than a spread angle of the circular truncated conical space of the pressurizing space 30e. Therefore, the refrigerant passage area of the refrigerant passage is gradually enlarged toward the downstream side in the refrigerant flow.

In this embodiment, the refrigerant passage area is enlarged as above. Thus, the refrigerant passage, which is formed between the inner peripheral surface of the middle body 33 and the outer peripheral surface of the lower part of the passage formation member 35 and configures the pressurizing space 30e, is defined as a diffuser passage 13c which functions as a diffuser. The diffuser passage 13c converts velocity energies of a mixture of the ejection refrigerant and the suction refrigerant into a pressure energy. That is, in the diffuser passage 13c, the ejection refrigerant and the suction refrigerant are mixed together and pressurized.

Further, a cross-section of the diffuser passage 13c perpendicular to the center axis also has an annular shape. As schematically illustrated in FIG. 3, the refrigerant that flows through the diffuser passage 13c also has a velocity component in a direction of swirling in the same direction as that of the refrigerant swirling in the swirling space 30a.

Next, the driving device 37 that is arranged within the middle body 33 and displaces the passage formation member 35 will be described. The driving device 37 is configured with a circular laminated diaphragm 37a which is a pressure responsive member. More specifically, as illustrated in FIG. 2, the diaphragm 37a is fixed by means such as welding so as to partition a cylindrical space formed on the outer peripheral side of the middle body 33 into two upper and lower spaces.

The upper space (the inflow space 30c side) of the two spaces partitioned by the diaphragm 37a configures a sealed space 37b in which a temperature sensitive medium is enclosed. A pressure of the temperature sensitive medium changes according to a temperature of the refrigerant flowing out of the evaporator 14. The temperature sensitive medium, which has the same composition as that of a refrigerant circulating in the ejector refrigeration cycle 10, is enclosed in the sealed space 37b so as to have a predetermined density. Accordingly, the temperature sensitive medium of this embodiment is medium mainly containing R134a.

On the other hand, the lower space of the two spaces partitioned by the diaphragm 37a configures an introduction space 37c into which the refrigerant flowing out of the evaporator 14 is introduced through a non-shown communication channel. Therefore, the temperature of the refrigerant flowing out of the evaporator 14 is transmitted to the temperature sensitive medium enclosed in the sealed space 37b via a cap member 37d and the diaphragm 37a. The cap member 37d partitions the inflow space 30c and the sealed space 37b.

In more detail, as apparent from FIGS. 2 and 3, the suction passage 13b is arranged on the upper side of the middle body 33 in this embodiment, and the diffuser passage 13c is arranged in an area extending from the center axis side of the middle body 33 to the lower side thereof. Therefore, at least a part of the driving device 37 is arranged at a position sandwiched by the suction passage 13b and the diffuser passage 13c from the vertical direction when viewed from the radial direction of the axis line.

The sealed space 37b of the driving device 37 is arranged at a position where the suction passage 13b overlaps with the diffuser passage 13c and at a position surrounded by the suction passage 13b and the diffuser passage 13c when viewed from a center axis direction of the swirling space 30a and the passage formation member 35. With this configuration, the temperature of the refrigerant flowing out of the evaporator 14 is transmitted to the sealed space 37b, and an internal pressure within the sealed space 37b becomes a pressure corresponding to the temperature of the refrigerant flowing out of the evaporator 14.

Further, the diaphragm 37a is deformed according to a differential pressure between the internal pressure of the sealed space 37b and the pressure of the refrigerant which has flowed into the introduction space 37c from the evaporator 14. For that reason, it is preferable that the diaphragm 37a is made of a material rich in elasticity, excellent in heat conduction, and tough. For example, it is desirable that the diaphragm 37a is formed of a metal laminate made of stainless steel (SUS304).

An upper end side of a cylindrical actuating bar 37e is joined to a center part of the diaphragm 37a by means such as welding, and a lower end side of the actuating bar 37e is fixed to a radially-outer and lowermost side (bottom side) of the passage formation member 35. With this configuration, the diaphragm 37a and the passage formation member 35 are coupled with each other, and the passage formation member 35 is displaced in accordance with a displacement of the diaphragm 37a to regulate the refrigerant passage area of the nozzle passage 13a (passage cross-sectional area in the minimum passage area part 30m).

Specifically, when the temperature (the degree of superheat) of the refrigerant flowing into the inflow space 30c out of the evaporator 14 rises, a saturated pressure of the temperature sensitive medium enclosed in the sealed space 37b rises to increase a differential pressure obtained by subtracting the pressure of the introduction space 37c from the internal pressure of the sealed space 37b. Accordingly, the diaphragm 37a displaces the passage formation member 35 in a direction of enlarging the passage cross-sectional area in the minimum passage area part 30m (downward in the vertical direction).

On the other hand, when the temperature (the degree of superheat) of the refrigerant flowing into the inflow space 30c out of the evaporator 14 falls, a saturated pressure of the temperature sensitive medium sealed in the sealed space 37b falls to decrease the differential pressure obtained by subtracting the pressure of the introduction space 37c from the internal pressure of the sealed space 37b. With the above configuration, the diaphragm 37a displaces the passage formation member 35 in a direction of reducing the passage cross-sectional area of the minimum passage area part 30m (toward the upper side in the vertical direction).

The diaphragm 37a displaces the passage formation member 35 vertically according to the temperature of the refrigerant flowing out of the evaporator 14 as described above. As a result, the passage cross-sectional area of the minimum passage area part 30m is adjusted so that the degree of superheating of the refrigerant flowing out of the evaporator 14 comes closer to a predetermined value. A gap between the actuating bar 37e and the middle body 33 is sealed by a seal member such as an O-ring not shown, and the refrigerant is not leaked through the gap even if the actuating bar 37e is displaced.

The bottom of the passage formation member 35 is subjected to a load of a coil spring 40 fixed to the lower body 34. The coil spring 40 exerts the load urging the passage formation member 35 so as to reduce the passage cross-sectional area in the minimum passage area part 30m. With the regulation of this load, a valve opening pressure of the passage formation member 35 can be changed to change a target degree of superheat.

Further, in this embodiment, the multiple (specifically, two) cylindrical spaces are provided in the part of the middle body 33 on the radially outer side, and the respective circular laminated diaphragms 37a are fixed in those spaces to configure two driving devices 37. However, the number of driving devices 37 is not limited to this number. When the driving devices 37 are provided at plural locations, it is desirable that the driving device 37 is arranged at regular angular intervals with respect to the respective center axes.

Alternatively, a diaphragm formed of the annular thin plate may be fixed in a space having an annular shape when viewed from the axial direction, and the diaphragm and the passage formation member 35 may be coupled with each other by multiple actuating bars.

Next, the lower body 34 is formed of a circular-cylindrical metal member, and fixed in the housing body 31 by means such as screwing so as to close a bottom of the housing body 31. In the internal space of the housing body 31, the gas-liquid separation space 30f that separates gas and liquid of the refrigerant that has flowed out of the diffuser passage 13c from each other is provided between the upper side of the lower body 34 and the bottom side of the middle body 33.

The gas-liquid separation space 30f is formed as a space having a shape of a solid of revolution, such as a substantially cylindrical shape, and the center axis of the gas-liquid separation space 30f is also arranged coaxially with the center axes of the swirling space 30a and the depressurizing space 30b.

As described above, the refrigerant flows in the diffuser passage 13c along the refrigerant passage having an annular cross-section shape while swirling. Therefore, the refrigerant that flows from the diffuser passage 13c into the gas-liquid separation space 30f also has a velocity component in the swirling direction. Therefore, the gas and liquid of refrigerant are separated by the action of the centrifugal force within the gas-liquid separation space 30f. In addition, an internal capacity of the gas-liquid separation space 30f has a volume insufficient to substantially accumulate excess refrigerant even if a load variation occurs in the cycle, and the refrigerant circulation flow rate circulating in the cycle is varied.

A cylindrical pipe 34a that is arranged coaxially with the gas-liquid separation space 30f and extends upward is disposed in the center part of the lower body 34. Therefore, the liquid-phase refrigerant separated by the gas-liquid separation space 30f is temporarily retained on the outer peripheral side of the pipe 34a, and flows out of the liquid-phase refrigerant outlet port 31c. A gas-phase refrigerant outflow passage 34b is provided inside the pipe 34a and guides the gas-phase refrigerant separated in the gas-liquid separation space 30f to the gas-phase refrigerant outlet port 31d.

Further, an inlet part 30j of a liquid-phase refrigerant outflow passage 30i is formed on a lower side (a side where a space in which the separated liquid-phase refrigerant is stored is formed) of an inner peripheral wall surface defining the gas-liquid separation space 30f of the housing body 31. The inlet part 30j of the liquid-phase refrigerant outflow passage 30i guides the liquid-phase refrigerant separated by the gas-liquid separation space 30f to the liquid-phase refrigerant outlet port 31c.

The above-mentioned coil spring 40 is fixed to an upper end of the pipe 34a. The coil spring 40 also functions as a vibration absorbing member that attenuates the vibration of the passage formation member 35, which is caused by a pressure pulsation generated when the refrigerant is depressurized.

An inlet part 34d of an oil return passage 34c is opened in an upper surface of an outer peripheral side of the pipe 34a in the lower body 34 formed in a cylindrical shape, that is, in a portion forming the bottom of the gas-liquid separation space 30f. The oil return passage 34c is a refrigerant passage that guides the liquid-phase refrigerant separated by the gas-liquid separation space 30f into which the refrigerant oil is mixed to the gas-phase refrigerant outflow passage 34b. The oil return passage 34c is formed into a shape extending in parallel to the axial direction of the gas-liquid separation space 30f. The oil return passage 34c extends in parallel to the axial direction of the passage formation member 35.

Figure 4:
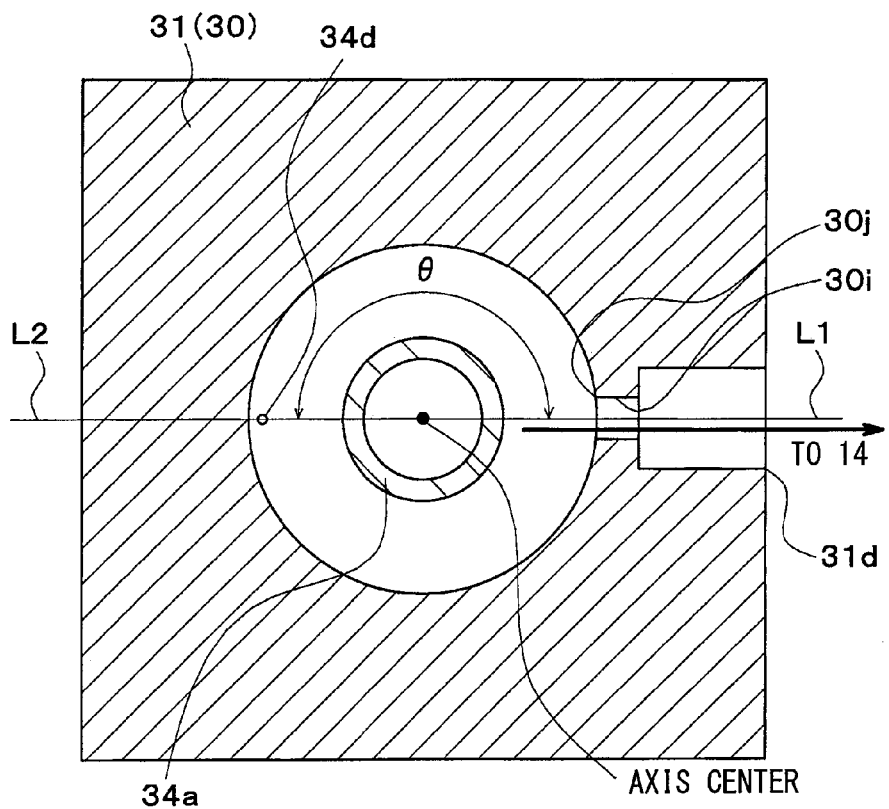
FIG. 4 is a cross-sectional view taken along a line IV-IV of FIG. 2.

Further, as indicated by a cross-sectional view of FIG. 4, the inlet part 34d of the oil return passage 34c is arranged at a position closer to the outer peripheral side of the gas-liquid separation space 30f than the axis center of the passage formation member 35. On the other hand, an outlet part 34e of the oil return passage 34c is opened in the gas-phase refrigerant outflow passage 34b.

In a cross-section surface perpendicular to the axial direction of the passage formation member 35, a line segment L1 extending from the axis center of the passage formation member 35 toward the center of an inlet part 30j of the liquid-phase refrigerant outflow passage 30i, and a line segment L2 extending from the axis center of the passage formation member 35 toward the center of the inlet part 34d of the oil return passage 34c are arranged on the same straight line.

That is, in this embodiment, an angle θ defined between the line segment L1 and the line segment L2 is 180°. Therefore, the angle defined between the line segment L1 and the line segment L2 is set to an angle at which the inlet part 30j of the liquid-phase refrigerant outflow passage 30i and the inlet part 34d of the oil return passage 34c are most distant from each other.

When the passage cross-sections of the inlet part 30j of the liquid-phase refrigerant outflow passage 30i and the inlet part 34d of the oil return passage 34c are not circularly formed, the centers of gravity of the passage cross-sections of the respective inlet parts 30j and 34c may be employed as the center of the inlet part 30j of the liquid-phase refrigerant outflow passage 30i and the center of the inlet part 34d of the oil return passage 34c.

The liquid-phase refrigerant outlet port 31c of the ejector 13 is connected with an inlet side of the evaporator 14 as illustrated in FIG. 1. The evaporator 14 is a heat exchanger for absorbing heat that evaporates a low-pressure refrigerant depressurized by the ejector 13 and performs a heat absorbing action by exchanging heat between the low-pressure refrigerant and blast air that is blown into the vehicle interior from a blower fan 14a.

The blower fan 14a is an electric blower the rotation speed (the amount of blast air) of which is controlled by a control voltage output from the control device. An outlet side of the evaporator 14 is connected with the refrigerant suction port 31b of the ejector 13. Further, the gas-phase refrigerant outlet port 31d of the ejector 13 is connected with the suction side of the compressor 11.

Next, the control device (not shown) includes a well-known microcomputer including a CPU, a ROM and a RAM, and peripheral circuits of the microcomputer. The control device controls the operations of the above-mentioned various electric actuators 11b, 12d, and 14a and the like by performing various calculations and processing on the basis of a control program stored on the ROM.

Further, a sensor group for controlling air conditioning, such as an inside air-temperature sensor for detecting a vehicle interior temperature, an outside air-temperature sensor for detecting the temperature of outside air, a solar radiation sensor for detecting the quantity of solar radiation in the vehicle interior, an evaporator-temperature sensor for detecting the blow-out air temperature from the evaporator 14 (the temperature of the evaporator), an outlet-side temperature sensor for detecting the temperature of a refrigerant on the outlet side of the heat radiator 12, and an outlet-side pressure sensor for detecting the pressure of a refrigerant present on the outlet side of the heat radiator 12, is connected to the control device. Accordingly, detection values of the sensor group are input to the control device.

Furthermore, an operation panel (not shown), which is disposed near a dashboard panel positioned at the front part in the vehicle interior, is connected to the input side of the control device, and operation signals output from various operation switches mounted on the operation panel are input to the control device. An air conditioning operation switch that is used to perform air conditioning in the vehicle interior, a vehicle interior temperature setting switch that is used to set the temperature of air present in the vehicle interior, and the like are provided as the various operation switches that are mounted on the operation panel.

Meanwhile, the control device of this embodiment is integrated with a control unit for controlling the operations of various control target devices connected to the output side of the control device, but structure (hardware and software), which controls the operations of the respective control target devices, of the control device forms the control unit of the respective control target devices. For example, a structure (hardware and software), which controls the operation of the electric motor 11b of the compressor 11, forms a discharge capability control unit in this embodiment.

Next, the operation of this embodiment having the above-mentioned configuration will be described with reference to a Mollier diagram of FIG. 5. The axis of ordinate in the Mollier diagram represents a pressure corresponding to P0, P1, and P2 in FIG. 3. First, when an operation switch of the operation panel is turned on, the control device operates the electric motor 11b of the compressor 11, the cooling fan 12d, and the blower fan 14a, and the like. Accordingly, the compressor 11 draws and compresses a refrigerant and discharges the refrigerant.

The gas-phase refrigerant (point a5 in FIG. 5), which is discharged from the compressor 11 and has a high temperature and a high pressure, flows into the condenser 12a of the heat radiator 12 and is condensed by exchanging heat between the blast air (outside air), which is blown from the cooling fan 12d, and itself and by radiating heat. The refrigerant, which has radiated heat in the condenser 12a, is separated into gas and liquid in the receiver part 12b. A liquid-phase refrigerant, which has been subjected to gas-liquid separation in the receiver part 12b, is changed into a subcooled liquid-phase refrigerant by exchanging heat between the blast air, which is blown from the cooling fan 12d, and itself in the subcooling portion 12c and further radiating heat (from point a5 to point b5 in FIG. 5).

Figure 5:
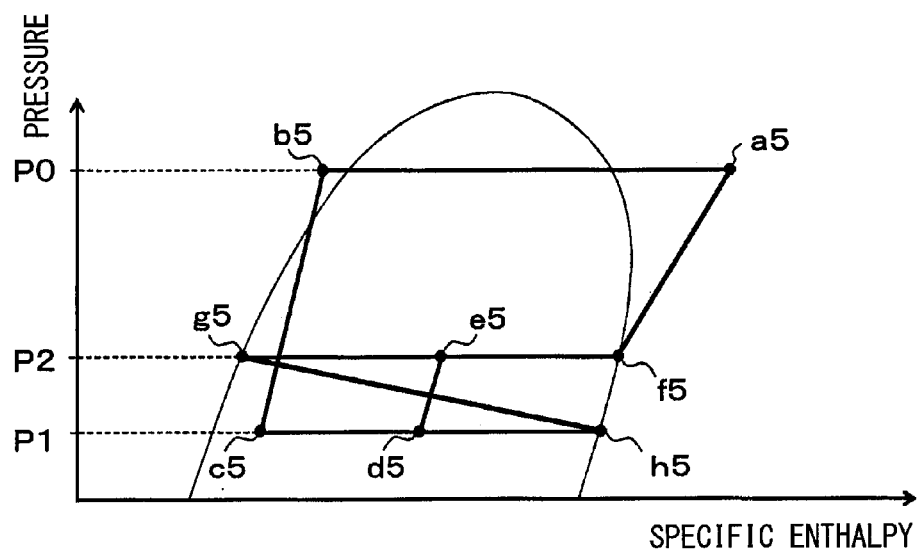
FIG. 5 is a Mollier diagram illustrating a state of the refrigerant in the ejector refrigeration cycle according to the first embodiment.

The subcooled liquid-phase refrigerant that has flowed out of the subcooling portion 12c of the heat radiator 12 is isoentropically depressurized by the nozzle passage 13a, and ejected (from point b5 to point c5 in FIG. 5). The nozzle passage 13a is formed between the inner peripheral surface of the depressurizing space 30b of the ejector 13 and the outer peripheral surface of the passage formation member 35. In this situation, the refrigerant passage area in the minimum passage area part 30m of the depressurizing space 30b is regulated so that the degree of superheating of the refrigerant on the outlet side of the evaporator 14 comes close to a predetermined given value.

The refrigerant that has flowed out of the evaporator 14 is drawn through the refrigerant suction port 31b and the suction passage 13b (the inflow space 30c, and the suction passage 30d) due to the suction action of the ejection refrigerant which has been jetted from the nozzle passage 13a. In addition, the ejection refrigerant jetted from the nozzle passage 13a and the suction refrigerant drawn through the suction passage 13b and the like flow into the diffuser passage 13c (from point c5 to point d5, and from point h5 to point d5 in FIG. 5).

In the diffuser passage 13c, the velocity energy of the refrigerant is converted into the pressure energy due to the enlarged refrigerant passage area. As a result, the mixed refrigerant is pressurized while the ejection refrigerant and the suction refrigerant are mixed together (from point d5 to point e5 in FIG. 5). The refrigerant that flowed out of the diffuser passage 13c is separated into gas and liquid in the gas-liquid separation space 30f (from point e5 to point f5, and from point e5 to point g5 in FIG. 5).

The liquid-phase refrigerant that has been separated in the gas-liquid separation space 30f flows out of the liquid-phase refrigerant outlet port 31c, and flows into the evaporator 14. The refrigerant having flowed into the evaporator 14 absorbs heat from the blast air blown by the blower fan 14a, and evaporates, and the blast air is cooled (point g5 to point h5 in FIG. 5). On the other hand, the gas-phase refrigerant that has been separated in the gas-liquid separation space 30f flows out of the gas-phase refrigerant outlet port 31d to be drawn into the compressor 11 and compressed again (point f5 to point a5 in FIG. 5).

The ejector refrigeration cycle 10 according to this embodiment operates as described above, and can cool the blast air to be blown into the vehicle interior. Further, in the ejector refrigeration cycle 10, since the refrigerant pressurized by the diffuser passage 13c is drawn into the compressor 11, the drive power of the compressor 11 can be reduced to improve the cycle of performance (COP).

Further, according to the ejector 13 of this embodiment, the refrigerant swirls in the swirling space 30a with the results that a refrigerant pressure on a swirling center side in the swirling space 30a can be reduced to a pressure of a saturated liquid-phase refrigerant, or a pressure at which the refrigerant is depressurized and boiled (cavitation occurs). With the above operation, a larger amount of gas-phase refrigerant is present on an inner peripheral side than an outer peripheral side of a swirling center axis. This leads to a two-phase separation state in which the refrigerant has a gas single phase in the vicinity of a swirling center line within the swirling space 30a, and has a liquid single phase around the vicinity thereof.

The refrigerant that has become in the two-phase separation state as described above flows into the nozzle passage 13a. As a result, in the convergent part 131 of the nozzle passage 13a, boiling of the refrigerant is promoted by the wall surface boiling generated when the refrigerant is separated from the outer peripheral side wall surface of the annular refrigerant passage, and the interface boiling caused by a boiling nuclear generated by the cavitation of the refrigerant on the center axis side of the annular refrigerant passage. Accordingly, the refrigerant that flows into the minimum passage area part 30m of the nozzle passage 13a becomes in a gas-liquid mixed state in which the gas phase and the liquid phase are uniformly mixed together.

The flow of the refrigerant in the gas-liquid mixed state is blocked (choked) in the vicinity of the minimum passage area part 30m. The refrigerant in the gas-liquid mixed state which reaches the sonic speed by the choking is accelerated in the divergent part 132, and ejected. As described above, the refrigerant of the gas-liquid mixed state can be efficiently accelerated to the sonic speed by the boiling promotion caused by both of the wall surface boiling and the interface boiling. As a result, the energy conversion efficiency (corresponding to the nozzle efficiency) in the nozzle passage 13a can be improved.

In addition, the ejector 13 of this embodiment employs the passage formation member 35 having a conical shape a cross-sectional area of which increases with distance from the depressurizing space 30b. The cross-sectional shape of the diffuser passage 13c is formed in an annular shape. Therefore, the diffuser passage 13c can have a shape to expand along the outer periphery of the passage formation member 35 with distance from the depressurizing space 30b, and the refrigerant flowing through the diffuser passage 13c can be swirled.

With the above configuration, since the flow channel for pressurizing the refrigerant can be formed into the spiral shape in the diffuser passage 13c, enlargement of the dimension of the diffuser passage 13c in the axial direction (the axial direction of the passage formation member 35) can be limited as compared with a case in which the diffuser portion is shaped to extend in the axial direction of the nozzle portion. As a result, the upsizing of the body of the overall ejector 13 can be restricted.

Also, the gas-liquid separation space 30f that separates gas and liquid of the refrigerant that has flowed out of the diffuser passage 13c is formed in the body 30 of the ejector 13 according to this embodiment. Hence, the capacity of the gas-liquid separation space 30f can be effectively reduced as compared with a case in which a gas-liquid separation device is provided in addition to the ejector 13.

That is, in the gas-liquid separation space 30f according to this embodiment, since the refrigerant that flows out of the diffuser passage 13c having the annular shape in cross-section has been already swirled, there is no need to provide a space for generating or growing the swirling flow of the refrigerant in the gas-liquid separation space 30f. Therefore, the capacity of the gas-liquid separation space 30f can be effectively reduced as compared with the case in which the gas-liquid separating device is provided apart from the ejector 13.

According to the ejector 13 of this embodiment, the inlet part 34d of the oil return passage 34c which opens in the gas-liquid separation space 30f is arranged at a position closer to the outer peripheral side than the axis center of the passage formation member 35 when viewed from the axial direction of the passage formation member 35. In other words, in the radial direction of the passage formation member 35, a distance between the inlet part 34d of the oil return passage 34c and the axis center of the passage formation member 35 is longer than a distance between the inlet part 34d and the outer peripheral side of the gas-liquid separation space 30f.

Therefore, the cross-sectional shape of the diffuser passage 13c is annularly formed, and the diffuser passage has the shape gradually enlarged on the outer peripheral side toward the downstream side in the refrigerant flow. The liquid-phase refrigerant localized on the outer peripheral side of the gas-liquid separation space 30f can efficiently flow into the oil return passage 34c due to the action of the centrifugal force. The liquid-phase refrigerant into which the refrigerant oil is mixed can flow out to the intake side of the compressor 11 through the gas-phase refrigerant outflow passage 34b.

That is, according to the ejector 13 of this embodiment, there can be realized the ejector integrated with the gas-liquid separation device which enables the liquid-phase refrigerant separated by the gas-liquid separation space 30f into which the refrigerant oil is mixed to appropriately flow out to an external.

According to the ejector 13 of this embodiment, the line segment L1 extending from the axis center of the passage formation member 35 toward the center of the inlet part 30j of the liquid-phase refrigerant outflow passage 30i, and the line segment L2 extending from the axis center of the passage formation member 35 toward the center of the inlet part 34d of the oil return passage 34c are arranged on the same straight line. Therefore, the gas-phase refrigerant separated in the gas-liquid separation space 30f can be effectively restrained from flowing into the oil return passage 34c.

The reason is because a liquid surface of the liquid-phase refrigerant within the gas-liquid separation space 30f is liable to be lowered in the vicinity of the inlet part 30j of the liquid-phase refrigerant outflow passage 30i. In other words, when the line segment L1 and the line segment L2 are arranged on a straight line, the inlet part 34d of the oil return passage 34c can be arranged at a position distant from the inlet part 30j of the liquid-phase refrigerant outflow passage 30i. Therefore, the lowering of the liquid surface of the liquid-phase refrigerant in the vicinity of the inlet part 34d of the oil return passage 34c can be restricted.

As a result, the gas-phase refrigerant separated in the gas-liquid separation space 30f can be effectively restrained from flowing into the oil return passage 34c.

According to the ejector 13 according to this embodiment, since the driving device 37 is provided, the passage formation member 35 can be displaced in accordance with a load variation of the refrigeration cycle 10 to regulate the refrigerant passage areas of the nozzle passage 13a and the diffuser passage 13c. Therefore, the ejector 13 can appropriately operate according to the load variation of the ejector refrigeration cycle 10.

Further, since the sealed space 37b in which a temperature sensitive medium is enclosed in the driving device 37 is arranged at a position sandwiched between the suction passage 13b and the diffuser passage 13c, a space formed between the suction passage 13b and the diffuser passage 13c can be effectively utilized. As a result, the upsizing of the body of the overall ejector can be further restricted.

Moreover, since the sealed space 37b is arranged at the position surrounded by the suction passage 13b and the diffuser passage 13c, the temperature of the refrigerant flowing out of the evaporator 14, of the refrigerant flowing through the suction passage 13b is excellently transmitted to the temperature sensitive medium without being affected by an outside air temperature, and the pressure in the sealed space 37b can be changed accordingly. That is, the pressure within the sealed space 37b can be changed with high precision depending on the temperature of the outflow refrigerant from the evaporator 14.

Second Embodiment

Figure 6:
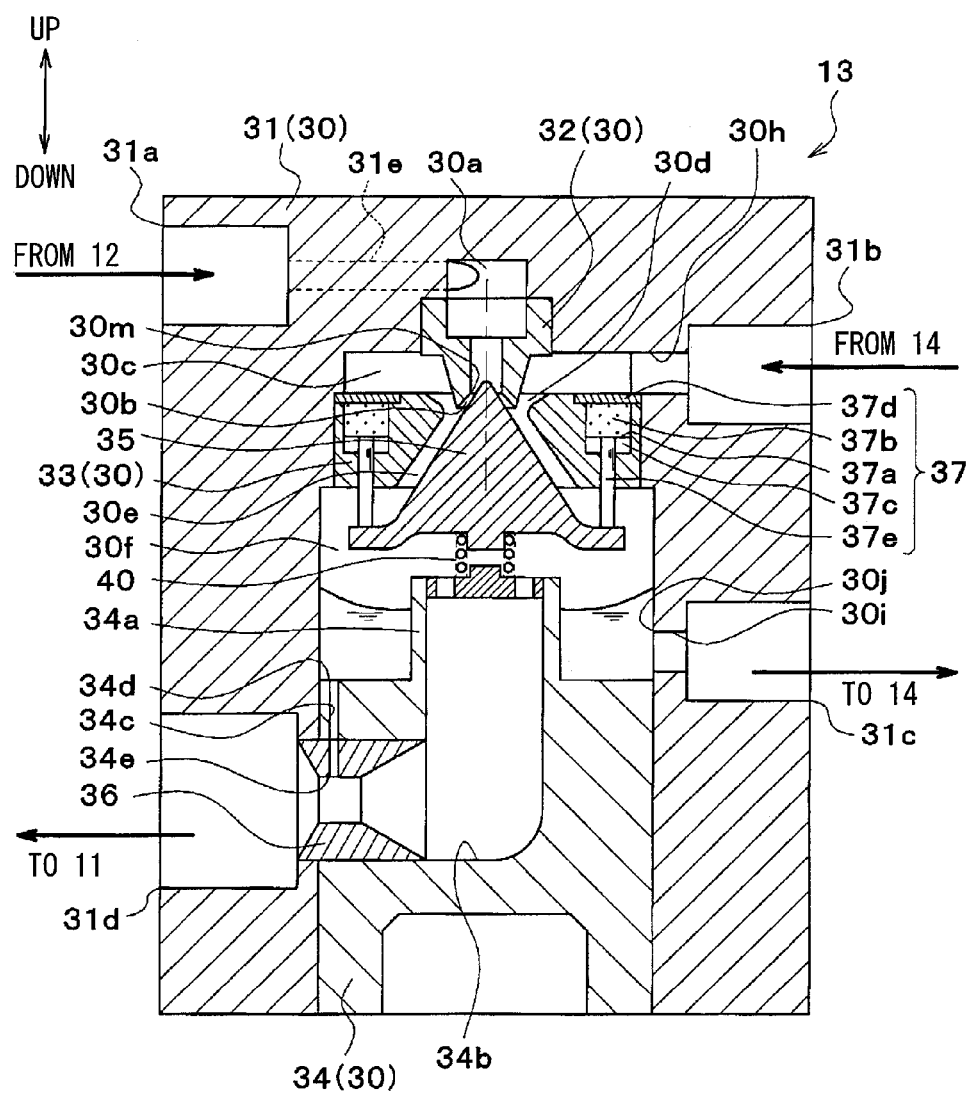
FIG. 6 is a sectional view taken along an axial direction of an ejector according to a second embodiment of the present disclosure.

In this embodiment, as compared with the first embodiment, as illustrated in a cross-sectional view of FIG. 6, an orifice 36 that exemplifies an outflow-passage depressurizing device for reducing a pressure of the refrigerant flowing out of the outlet part 34e of the oil return passage 34c is arranged in the gas-phase refrigerant outflow passage 34b of the ejector 13. In more detail, the orifice 36 reduces a communication cross-sectional area within the gas-phase refrigerant outflow passage 34b to reduce the refrigerant pressure flowing out of the outlet part 34e of the oil return passage 34c.

The other configurations of the ejector 13 and the ejector refrigeration cycle 10 are identical with those in the first embodiment. Accordingly, the same advantages as those in the first embodiment can be obtained even in the ejector 13 of this embodiment.

Further, in the ejector 13 of this embodiment, since the orifice 36 is provided, the refrigerant pressure in the outlet part 34e can be reduced more than the refrigerant pressure in the inlet part 34d of the oil return passage 34c. Therefore, the liquid-phase refrigerant into which the refrigerant oil is mixed can surely flow out to the intake side of the compressor 11. Further, with the appropriate setting of the amount of decompression in the orifice 36, a flow rate of the liquid-phase refrigerant that returns to the intake side of the compressor 11 can be appropriately adjusted through the oil return passage 34c.

Third Embodiment

Figure 7:
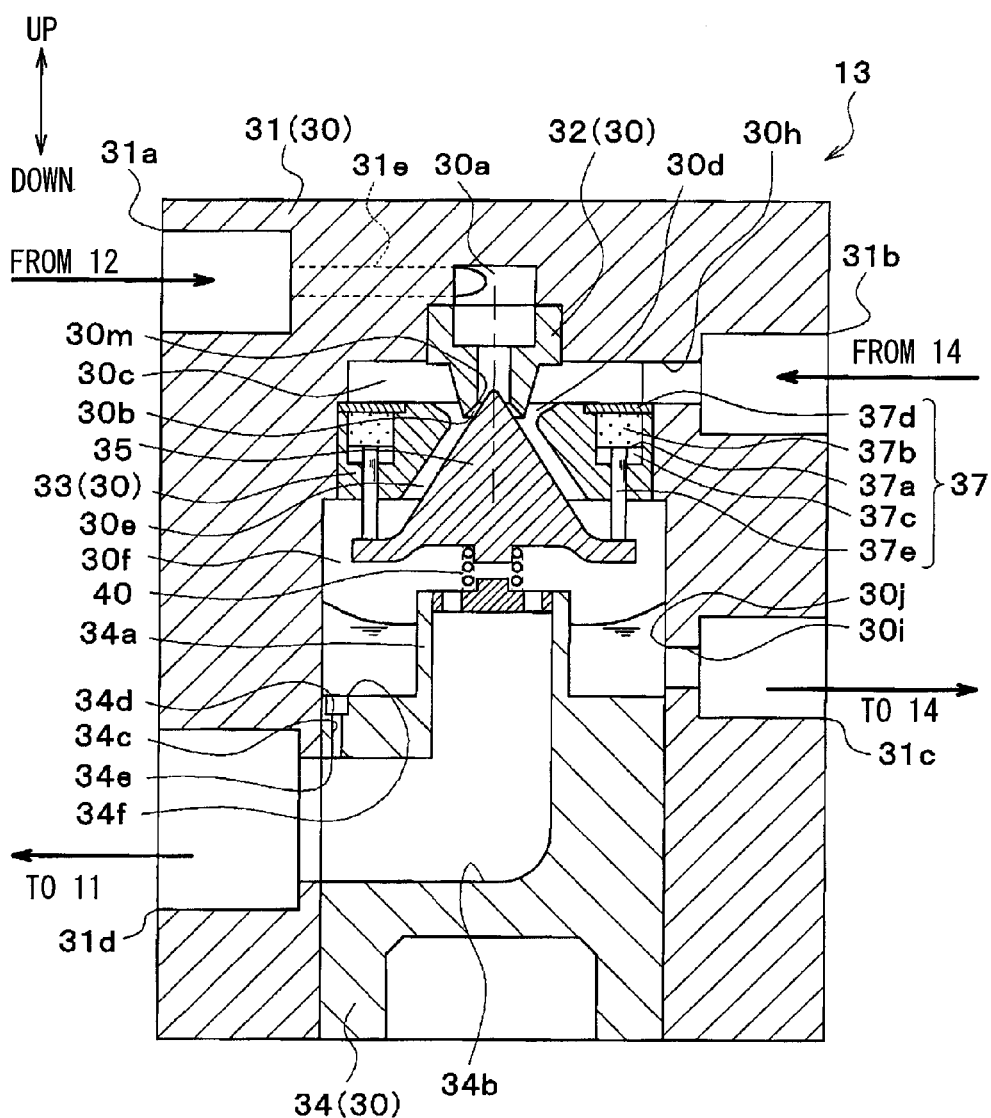
FIG. 7 is a sectional view taken along an axial direction of an ejector according to a third embodiment of the present disclosure.

In this embodiment, as compared with the first embodiment, as illustrated in a cross-sectional view of FIG. 7, a reservoir hole 34f is disposed. Specifically, the reservoir hole 34f is formed by subjecting a portion forming an upper surface of the outer peripheral side of the pipe 34a in the lower body 34, that is, a bottom of the gas-liquid separation space 30f to counterbore processing to recess the bottom on the lower side.

Therefore, the reservoir hole 34f forms a lowermost space of the gas-liquid separation space 30f therein, and the liquid-phase refrigerant separated within the gas-liquid separation space 30f preferentially flows into the reservoir hole 34f. Further, an inner diameter of the reservoir hole 34f is formed to be larger than a passage diameter of the oil return passage 34c, and the inlet part 34d of the oil return passage 34c in this embodiment is opened in the bottom of the reservoir hole 34f.

The other configurations of the ejector 13 and the ejector refrigeration cycle 10 are identical with those in the first embodiment. Accordingly, the same advantages as those in the first embodiment can be obtained even in the ejector 13 of this embodiment.

Further, in the ejector 13 of this embodiment, the reservoir hole 34f is formed in the portion forming the bottom of the gas-liquid separation space 30f, and the inlet part 34d of the oil return passage 34c is opened in the reservoir hole 34f. Therefore, even when the liquid surface in the gas-liquid separation space 30f is lowered by load variations, or even when the liquid surface of the gas-liquid separation space 30f is lowered by the inclination of a vehicle, the liquid-phase refrigerant into which the refrigerant oil is mixed can stably flow into the oil return passage 34c.

It is needless to say that the reservoir hole 34f may be applied to the ejector 13 having the orifice 36 exemplifying the outflow-passage depressurizing device in the second embodiment.

Fourth Embodiment

Figure 8A:
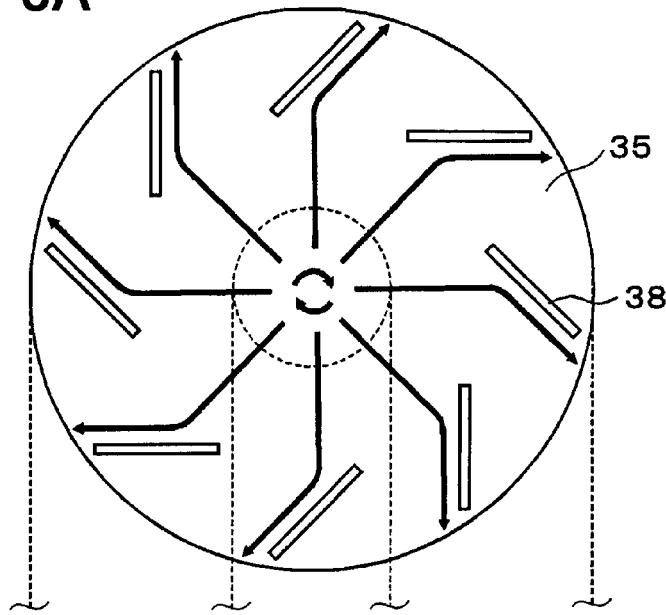
FIG. 8A is a schematic top diagram illustrating a passage formation member of an ejector according to a fourth embodiment of the present disclosure.
Figure 8B:
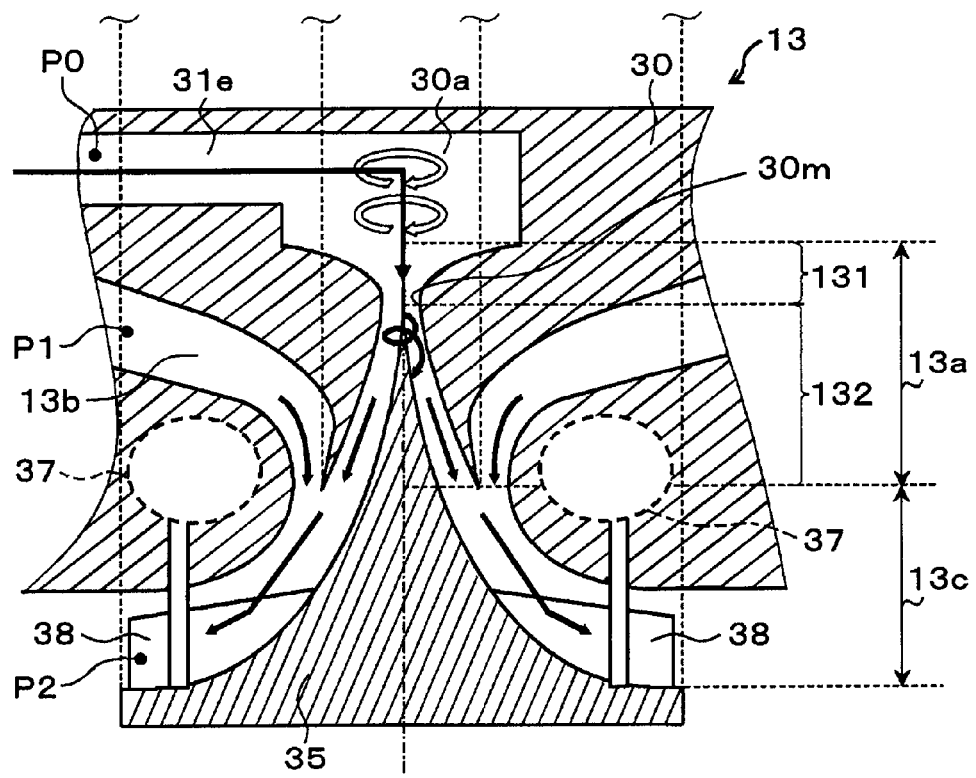
FIG. 8B is a schematic sectional diagram illustrating the ejector according to the fourth embodiment.

In this embodiment, a description will be given of an example in which, as illustrated in FIGS. 8A and 8B, multiple flow regulation plates 38 exemplifying the swirling promotion port for promoting the swirling of the refrigerant flowing out of the diffuser passage 13c around an axis of the passage formation member 35 are added to the ejector 13 of the first embodiment. In FIG. 8A, when viewing the passage formation member 35 from the axial direction, a flowing direction of the refrigerant flowing along a conical side of the passage formation member 35 is schematically illustrated by thick solid arrows, and the flow regulation plates 38 are also schematically illustrated.

In more detail, the flow regulation plates 38 are arranged on portions forming the outer peripheral side of a lowermost portion of the passage formation member 35 and the refrigerant outlet side of the diffuser passage 13c. Further, the flow regulation plates 38 are formed of plate members spread in the axial direction of the passage formation member 35. As illustrated in FIG. 8A, the flow regulation plates 38 are annularly arranged around the axis of the passage formation member 35.

The respective flow regulation plates 38 are arranged so that plate surfaces thereof are inclined with respect to a radial direction when viewed from the axial direction. The refrigerant flowing out of the diffuser passage 13c flows along the plate surfaces of the respective flow regulation plates 38 to promote the flow of the refrigerant flowing out of the diffuser passage 13c in the swirling direction. Other structures and operations are the same as those of the first embodiment. Accordingly, the same advantages as those in the first embodiment can be obtained even in the ejector 13 of this embodiment.

For example, in an operating condition where the refrigerant flow rate flowing in the cycle is reduced with the reduction of a heat load of the ejector refrigeration cycle 10, a velocity component in the swirling direction may be extremely reduced as compared with the velocity component in the axial direction, or the velocity component in the swirling direction may be almost eliminated, in the velocity components of the refrigerant flowing in the diffuser passage 13c.

On the contrary, according to the ejector 13 of this embodiment, since the flow regulation plates 38 exemplifying the swirling promotion portion are provided, the refrigerant flowing into the gas-liquid separation space 30f can swirl around the axis of the passage formation member 35 regardless of the operating conditions of the ejector refrigeration cycle 10 as indicated by the thick solid arrows in FIGS. 8A and 8B. Therefore, the centrifugal force can be surely exerted on the refrigerant in the gas-liquid separation space 30f.

As a result, according to the ejector 13 of this embodiment, the refrigerant flowing into the gas-liquid separation space 30f can be surely separated into gas and liquid regardless of the operating conditions of the ejector refrigeration cycle 10. In addition, the separated liquid-phase refrigerant can flow into the oil return passage 34c while being surely localized on the outer peripheral side of the gas-liquid separation space 30f.

In this embodiment, the flow regulation plates 38 each formed into the plate shape are described. However, the flow regulation plates 38 are not limited to this configuration. If the flowing of the refrigerant while swirling around the axis of the passage formation member 35 can be promoted, the flow regulation plates 38 may have a shape curved along the swirling flowing direction when viewed from the axial direction.

In this embodiment, as illustrated in FIG. 8A, multiple flow regulation plates 38 are arranged in a so-called decelerating cascade arrangement in which an interval between the respective flow regulation plates 38 on the refrigerant flow outlet side is wider than an interval between the respective flow regulation plates 38 on the inlet side. According to the above configuration, the flow regulation plates 38 can function as a diffuser that gradually enlarges the passage cross-sectional area of the refrigerant passage defined between the respective adjacent flow regulation plates 38 to convert a velocity energy of the refrigerant into a pressure energy.

Further, the arrangement of the flow regulation plates 38 is not limited to the above arrangement, but may be arranged in a so-called speed increasing cascade arrangement (accelerating cascade arrangement) in which the interval between the respective flow regulation plates 38 on the refrigerant flow outlet side is narrower than the interval between the respective flow regulation plates 38 on the refrigerant flow inlet side. According to this configuration, since the passage cross-sectional area of the refrigerant passage defined between the respective adjacent flow regulation plates 38 can be gradually reduced to increase the flow rate in the swirling direction of the refrigerant, the swirling flow can be effectively promoted.

This disclosure is not limited to the above-mentioned embodiments, and may have various modifications as described below without departing from the gist of this disclosure.

(1) In the above embodiments, the inlet part 34d of the oil return passage 34c is arranged on the portion forming the bottom of the gas-liquid separation space 30f in the lower body 34, and arranged at a visible position when viewed from the axial direction of the passage formation member 35. However, the arrangement of the inlet part 34d of the oil return passage 34c is not limited to the above arrangement.

In other words, when viewed from the axial direction of the passage formation member 35, if the inlet part 34d of the oil return passage 34c is arranged at a position closer to the outer peripheral side of the gas-liquid separation space 30f than the axis center of the passage formation member 35, the inlet part 34d may be arranged on a portion forming a cylindrical side of the gas-liquid separation space 30f in the housing body 31, or may be arranged on a cylindrical side of the pipe 34a of the lower body 34, for example.

(2) In the above embodiments, a detailed configuration of the liquid-phase refrigerant outflow passage 30i connecting the gas-liquid separation space 30f and the liquid-phase refrigerant outlet port 31c is not described. As illustrated in a cross-sectional view of FIG. 9, the liquid-phase refrigerant outflow passage 30i may extend in the tangential direction of the inner peripheral wall surface of the gas-liquid separation space 30f. With the above configuration, a kinetic energy of the refrigerant swirling in the gas-liquid separation space 30f is effectively utilized, and the refrigerant can flow out to the evaporator 14 side.

Even when the liquid-phase refrigerant outflow passage 30i is configured as described above, as illustrated in FIG. 9, the line segment L1 and the line segment L2 may be arranged on the same straight line. In other words, the line segment L1 and the line segment L2 may be arranged so that the angle θ defined between the line segment L1 and the line segment L2 becomes 180°.

According to the present inventors' study, it is found that if the angle defined between the line segment L1 and the line segment L2 is equal to or more than 90°, the gas-phase refrigerant can be sufficiently restrained from flowing into the oil return passage 34c.

Figure 10:
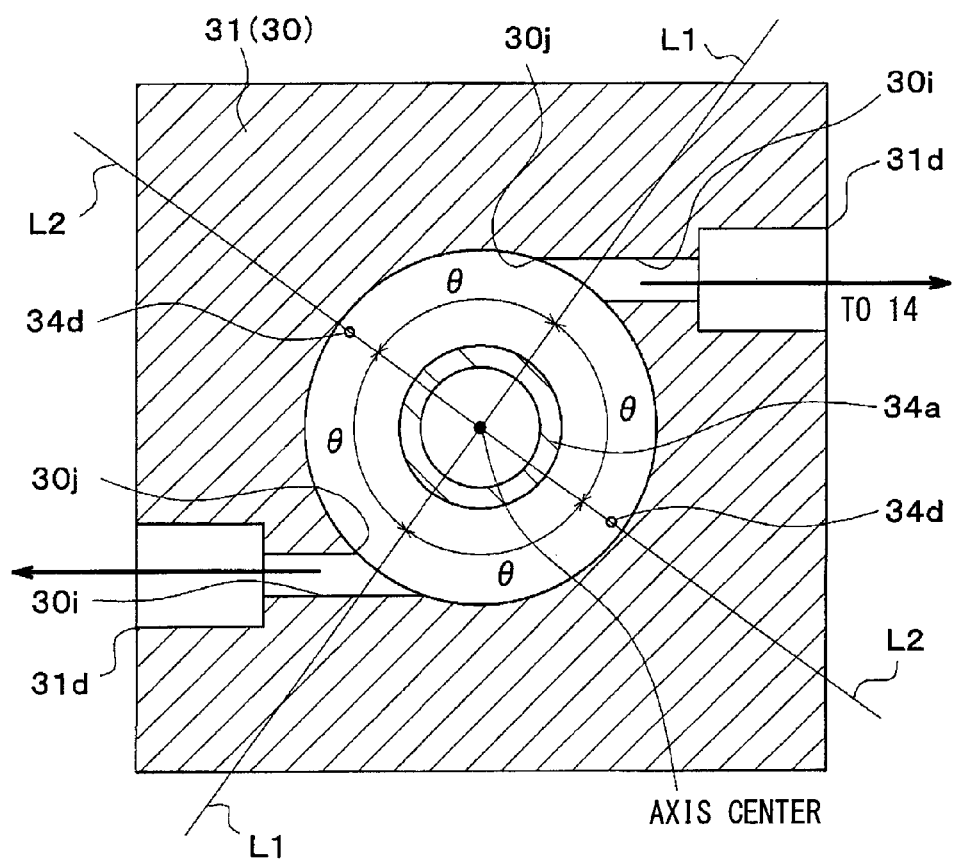
FIG. 10 is a cross-sectional view illustrating another positional relationship between the inlet portion of the oil return passage and the inlet portion of the liquid-phase refrigerant flow passage in the modification.

Therefore, even when the multiple oil return passages 34c and the multiple liquid-phase refrigerant outflow passages 30i are provided, it is desirable that the angle defined between the line segment L1 and the line segment L2 is 90° or more. For example, when two oil return passages 34c and two liquid-phase refrigerant outflow passages 30i are provided, the line segment L1 and the line segment L2 may be arranged as illustrated in FIG. 10.

Figure 9:
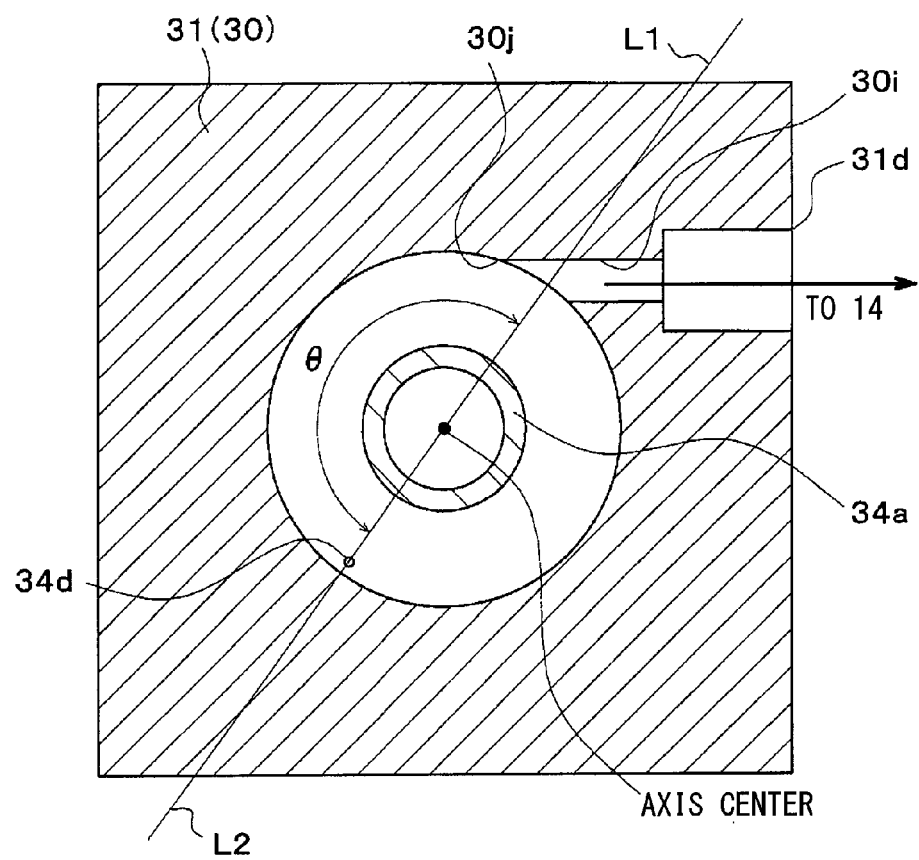
FIG. 9 is a cross-sectional view illustrating a positional relationship between an inlet portion of an oil return passage and an inlet portion of a liquid-phase refrigerant flow passage in a modification.

That is, the inlet parts 34d of the two oil return passages 34c may be arranged symmetrically with respect to the axis center of the passage formation member 35, and the inlet parts 30j of the two liquid-phase refrigerant outflow passages 30i may be arranged symmetrically with respect to the axis center of the passage formation member 35. Further, the respective four inlet parts 34d and 30j may be arranged at intervals of 90° with respect to the axis center of the passage formation member 35. Meanwhile, FIGS. 9 and 10 are views each corresponding to FIG. 4 of the first embodiment.

(3) In the above embodiments, the details of the liquid-phase refrigerant outlet port 31c of the ejector 13 are not described. A depressurizing device (for example, side fixed aperture including an orifice or a capillary tube) for depressurizing the refrigerant may be arranged on the liquid-phase refrigerant outlet port 31c. For example, a fixed aperture may be added to the liquid-phase refrigerant outlet port 31c, and the ejector 13 may be applied to an ejector refrigeration cycle with a two-stage pressurizing type compressor.

(4) In the above embodiments, the description has been given of the example in which the driving device 37 that displaces the passage formation member 35 includes the sealed space 37b in which the temperature sensitive medium having the pressure changed according to a change in the temperature is sealed, and the diaphragm 37a that is displaced according to the pressure of the temperature sensitive medium within the sealed space 37b. However, the driving device is not limited to this configuration.

For example, a thermowax having a volume changed according to the temperature may be employed as the temperature sensitive medium, or a configuration having an elastic member of a shape memory alloy may be used as the driving device. Further, a configuration in which the passage formation member 35 may be displaced by an electric mechanism such as an electric motor or a solenoid may be employed as the driving device.

(5) In the above-mentioned embodiments, although a material of the passage formation member 35 is not described, the passage formation member 35 may be made of metal (for example, aluminum) or resin. For example, when the passage formation member 35 is made of resin, and reduced in weight, the driving device 37 can be downsized, and the body of the overall ejector 13 can be further downsized.

(6) In the above embodiments, the example in which the ejector refrigeration cycle 10 including the ejector 13 of the present disclosure is applied to a vehicle air conditioning apparatus has been described, but the application of the ejector refrigeration cycle 10 having the ejector 13 of the present disclosure is not limited to this configuration. For example, the ejector refrigeration cycle 10 may be applied to, for example, a stationary air conditioning apparatus, cold storage warehouse, a cooling heating device for vending machine, etc.

(7) Examples in which a subcooling heat exchanger is employed as the heat radiator 12 have been described in the above-mentioned embodiments, but, needless to say, a normal heat radiator formed of only the condenser 12a may be employed as the heat radiator 12.

What is claimed is:

1. An ejector for a vapor compression refrigeration cycle device in which a refrigerant oil for lubrication of a compressor is mixed into a refrigerant, the ejector comprising:
   a body including a refrigerant inlet port, a swirling space in which a refrigerant flowing from a refrigerant inlet port is swirled, a depressurizing space in which the refrigerant flowing out of the swirling space is depressurized, a suction passage that communicates with a downstream side of the depressurizing space in a refrigerant flow and draws a refrigerant from an external, and a pressurizing space in which an ejection refrigerant jetted from the depressurizing space is mixed with a suction refrigerant drawn from the suction passage; and
   a passage formation member that is at least partially arranged inside the depressurizing space and inside the pressurizing space, and has a conical shape in which a cross-sectional area increases with distance from the depressurizing space, wherein
   a refrigerant passage provided between an inner peripheral surface of a portion of the body, which defines the depressurizing space, and an outer peripheral surface of the passage formation member is a nozzle passage functioning as a nozzle that depressurizes and jets the refrigerant flowing out of the swirling space,
   a refrigerant passage provided between an inner peripheral surface of a portion of the body, which defines the pressurizing space, and an outer peripheral surface of the passage formation member is a diffuser passage functioning as a diffuser that pressurizes a mixture of the ejection refrigerant and the suction refrigerant,
   the diffuser passage has an annular shape in a cross-section surface perpendicular to an axial direction of the passage formation member,
   the body further includes a gas-liquid separation space that separates the refrigerant flowing out of the diffuser passage into gas and liquid by an action of a centrifugal force, a gas-phase refrigerant outflow passage through which a gas-phase refrigerant separated by the gas-liquid separation space flows out to an intake side of the compressor, and an oil return passage that guides a liquid-phase refrigerant, which is separated by the gas-liquid separation space and mixed with the refrigerant oil, from the gas-liquid separation space to the gas-phase refrigerant outflow passage,
   the oil return passage has an inlet part that is open in the gas-liquid separation space, and
   a distance from the inlet part of the oil return passage to an axis center of the passage formation member is longer than a distance from the inlet part to an outer peripheral side of the gas-liquid separation space in a radial direction of the passage formation member.

2. The ejector according to claim 1, wherein
   the oil return passage has an outlet part that is open in the gas-phase refrigerant outflow passage, and
   the ejector further comprising an outflow-passage depressurizing device that reduces a pressure of the refrigerant flowing out of the outlet part in the gas-phase refrigerant outflow passage.

3. The ejector according to claim 1, wherein
   the body has a reservoir hole that is recessed from a bottom of the gas-liquid separation space and is a hole into which the liquid-phase refrigerant separated by the gas-liquid separation space flows preferentially over the gas-phase refrigerant, and
   the inlet part of the oil return passage is open in the reservoir hole.

4. The ejector according to claim 1, wherein
   the body further includes a liquid-phase refrigerant outflow passage in which the liquid-phase refrigerant separated by the gas-liquid separation space flows out,
   the liquid-phase refrigerant outflow passage has an inlet part that is open in the gas-liquid separation space, and
   an angle between a line segment extending from the axis center of the passage formation member toward a center of the inlet part of the liquid-phase refrigerant outflow passage and a line segment extending from the axis center of the passage formation member toward a center of the inlet part of the oil return passage is equal to or more than 90° in a cross-section surface perpendicular to an axial direction of the passage formation member.

5. The ejector according to claim 1, further comprising a swirling promotion portion that promotes the swirling of the refrigerant flowing out of the diffuser passage around an axis of the passage formation member.

6. The ejector according to claim 1, wherein the refrigerant flowing in the diffuser passage swirls around an axis of the passage formation member.

7. The ejector according to claim 1, wherein the oil return passage extends parallel to an axial direction of the passage formation member.

\* \* \* \* \*